(12) United States Patent
Cheung (10) Patent No.: US 7,108,147 B2
(45) Date of Patent: Sep. 19, 2006

(54) VACUUM PUMP VALVE

(75) Inventor: George F. Cheung, La Mirada, CA (US)

(73) Assignee: Intelli Innovations Ltd., Hong Kong (HK)

( * ) Notice: Subject to any disclaimer, the term of this patent is extended or adjusted under 35 U.S.C. 154(b) by 0 days.

(21) Appl. No.: 11/002,944

(22) Filed: Dec. 1, 2004

(65) Prior Publication Data

US 2006/0118168 A1 Jun. 8, 2006

(51) Int. Cl.
*B65D 51/16* (2006.01)

(52) U.S. Cl. .......................... 220/203.29; 137/533.31; 141/65

(58) Field of Classification Search .............. 220/203.2, 220/203.27, 203.29, 212; 137/533.29, 533.31; 141/65

See application file for complete search history.

(56) References Cited

U.S. PATENT DOCUMENTS

| | | | | |
|---|---|---|---|---|
| 1,907,770 A | * | 5/1933 | Feagles et al. | 220/203.27 |
| 4,479,460 A | * | 10/1984 | Webber | 220/203.29 |
| 4,691,836 A | * | 9/1987 | Wassilieff | 220/234 |
| 5,031,785 A | * | 7/1991 | Lemme | 141/65 |
| 5,121,590 A | * | 6/1992 | Scanlan | 141/65 |
| 6,349,842 B1 | * | 2/2002 | Reutter | 220/203.27 |

FOREIGN PATENT DOCUMENTS

DE 4103883 * 8/1992

* cited by examiner

*Primary Examiner*—Michael Koczo, Jr.
(74) *Attorney, Agent, or Firm*—Raymond Y. Chan; David & Raymond Patent Group (57) ABSTRACT

A vacuum pump valve includes a valve body and a suction diaphragm. The valve body includes a sealing platform sealedly attached on the container at the opening thereof, and a guiding sleeve upwardly extended from the sealing platform to form a suction channel, wherein the sealing platform has an operation slot formed thereon at a position within the suction channel and at least a through ventilating groove communicating the receiving cavity of the container with an exterior thereof. The suction diaphragm is disposed within the suction channel of the valve body, including an enlarged sealing head adapted to seal on the sealing platform to enclose the ventilating groove thereof, and a guiding shaft extended from the sealing head to slidably mounted at the sealing platform at the operation slot to move the sealing head between a releasing position and a sealing position.

13 Claims, 7 Drawing Sheets

VACUUM PUMP VALVE

BACKGROUND OF THE PRESENT INVENTION

1. Field of Invention

The present invention relates to a sealing valve, and more particularly to a vacuum pump valve which is capable of effectively sealing a particular container in a vacuum manner.

2. Description of Related Arts

Vacuum pumps have widely been utilized to extract air from a food container, such as a plastic bag, so as to create a vacuum environment within the container for preserving the food for a prolonged period of time. The basic steps for sealing a container is pretty simple: first, a vacuum pump is inserted into the container via a vacuum opening; second, a user may turn on the vacuum pump for extracting air within the container, third, the vacuum pump is detached from the container, finally, the vacuum opening should be effective sealed to prevent air going in or out of the container via the vacuum opening.

As a matter of conventional practice, the latter step represents the most important factor in determining the final outcome of the vacuum sealing process. No matter how efficient and effective the vacuum pump is, when the vacuuming process is finished, it has to be detached from the container and the vacuum opening must be effectively sealed in order to prevent re-entering the container again. As a result, if there was substantial re-entering of air, the container would be filled with considerable amount of air which eventually contaminates micro-organisms and bacteria within the container sufficient to deteriorate the food contained in the container.

Conventional vacuum valve for sealing this vacuum opening is generally unsatisfactory in that leakage frequently occurs between the container and its exterior so that air can pass through the vacuum opening and deteriorates the food in the container, which is originally supposed to be preserved for a prolonged period of time.

Conventionally on the other hand, the above-mentioned vacuum pump may be utilized for sealing plastic bags as well as certain specifically designed rigid container. Very often, different kinds of containers utilize different kinds of sealing valves. For example, a sealing valve for sealing a plastic bag may not be suitable to employ in a rigid container so that another different kind of sealing valve is needed. This inevitably increases the manufacturing cost of the sealing valve as well as the respective container as a whole.

Apart from all these, it must also be appreciate that very often, the presence of sealing valve may affect the operation of the vacuum pump and effective creation of vacuum environment within the container. For example, when a plastic bag is being vacuumed and collapsing, a boundary between the sealing valve and the plastic bag may not be fittedly aligned so that a significant amount of air is trapped at the boundary.

SUMMARY OF THE PRESENT INVENTION

A main object of the present invention is to provide a vacuum pump valve which is capable of effectively sealing a particular container in a vacuum manner, so as to retain a vacuum environment within the container for a prolonged period of time.

Another object of the present invention is to provide a vacuum pump valve comprising a suction element automatically operating corresponding with a suction effect of a vacuum pump for allowing effective suction and sealing of the container. In other words, the vacuum pump valve automatically allow withdrawal of air within the container when the vacuum pump is turn on, and automatically seal the container when the vacuum pump is turned off and detached from the container.

Another object of the present invention is to provide a vacuum pump valve which is adapted for use in plastic bags as well as rigid containers so as to maximize its range of applications. In other words, the present invention is suitable for use in a wide variety of containers.

Another object of the present invention is to provide a vacuum pump valve which does not interfere with an operation of the vacuum pump, nor affecting the passage of air within the container, so as to fully co-operate with the operation of the vacuum pump in creating the vacuum environment within the container.

Another object of the present invention is to provide a vacuum pump valve which is easy and convenient to use, and economical to manufacture, so as to minimize the ultimate selling price of the present invention for widespread application thereof.

Accordingly, in order to accomplish the above objects, the present invention provides a vacuum pump valve of a container having a cavity and an opening communicating therewith, comprising:

a valve body comprising a sealing platform sealedly attached on the container at the opening thereof and guiding sleeve upwardly extended from the sealing platform to form a suction channel, wherein the sealing platform has an operation hole formed thereon at a position within the suction channel and at least a through ventilating hole adjacent to the operation hole to communicate the cavity of the container with an exterior thereof; and a suction element, which is disposed within the suction channel of the valve body, comprising an enlarged sealing head adapted to seal on the sealing platform to enclose the ventilating hole thereof and a guiding shaft extended from the sealing head to slidably mount at the sealing platform at the operation hole to move the sealing head between a releasing position and a sealing position, wherein at the releasing position, the guiding shaft is upwardly slid along the operation hole to upwardly pull the sealing head apart from the sealing platform so as to allow air in the cavity to be withdrawn through the ventilating hole, and at the sealing position, the guiding shaft is downwardly slid along the operation hole to seal the sealing head on the sealing platform at the ventilating hole so as to retain the container in a vacuum manner.

These and other objectives, features, and advantages of the present invention will become apparent from the following detailed description, the accompanying drawings, and the appended claims.

DETAILED DESCRIPTION OF THE PREFERRED EMBODIMENT

Figure 1:
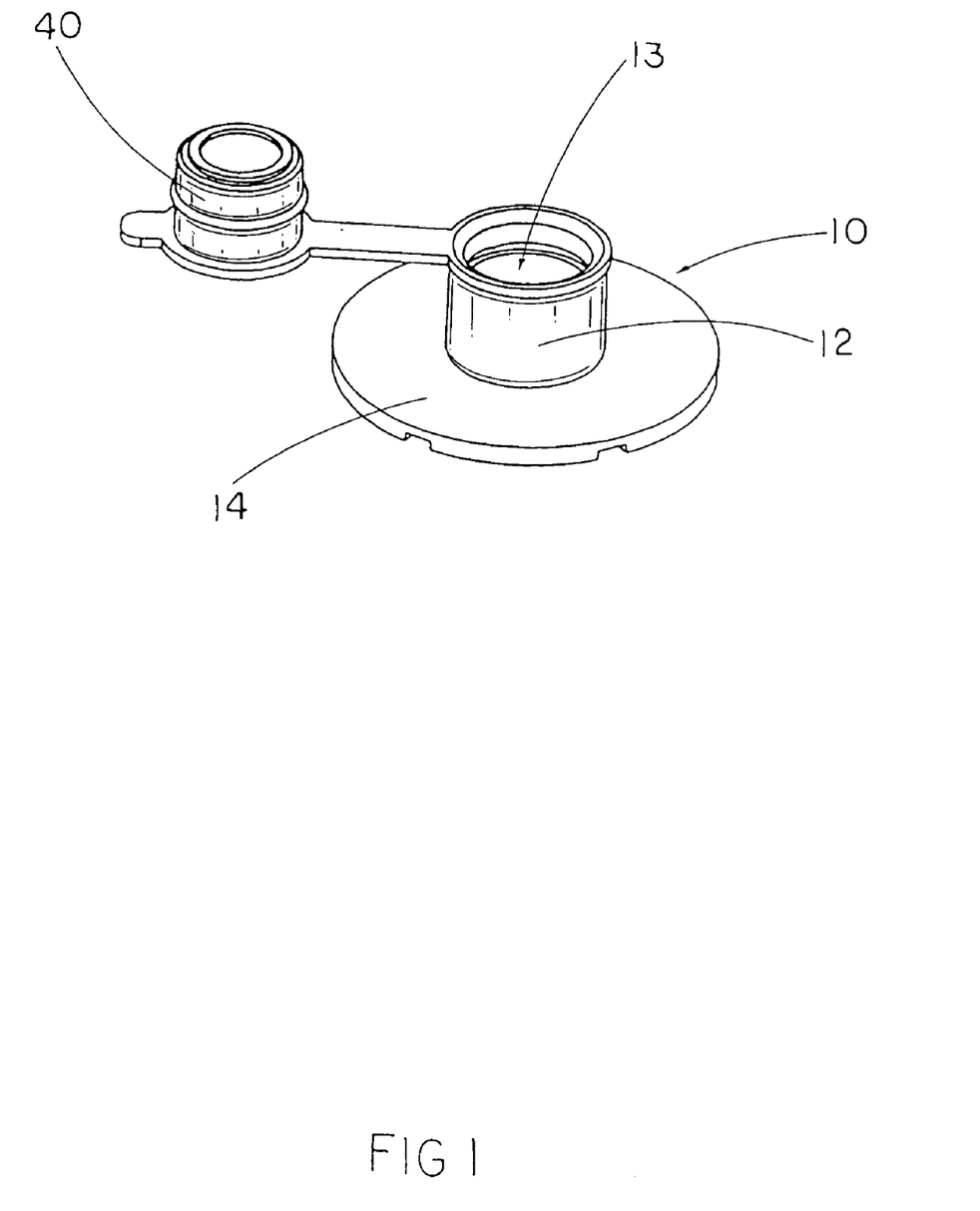
FIG. 1 is a perspective view of a vacuum pump valve according to a first preferred embodiment of the present invention.
Figure 2A:
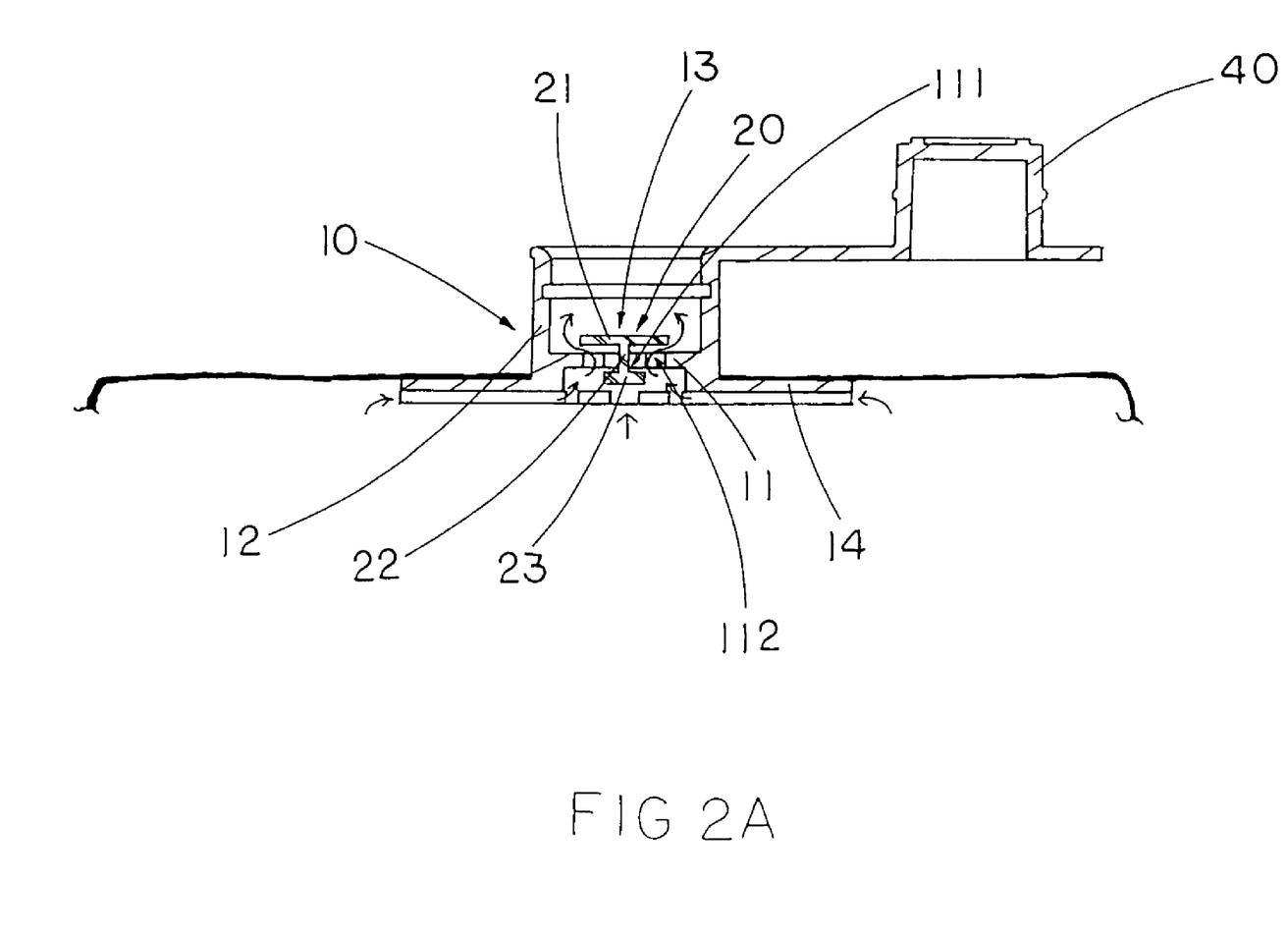
FIG. 2A and FIG. 2B are sectional side views of the vacuum pump valve according to the above first preferred embodiment of the present invention, illustrating that the suction element is at the releasing position and a sealing position respectively.
Figure 2B:
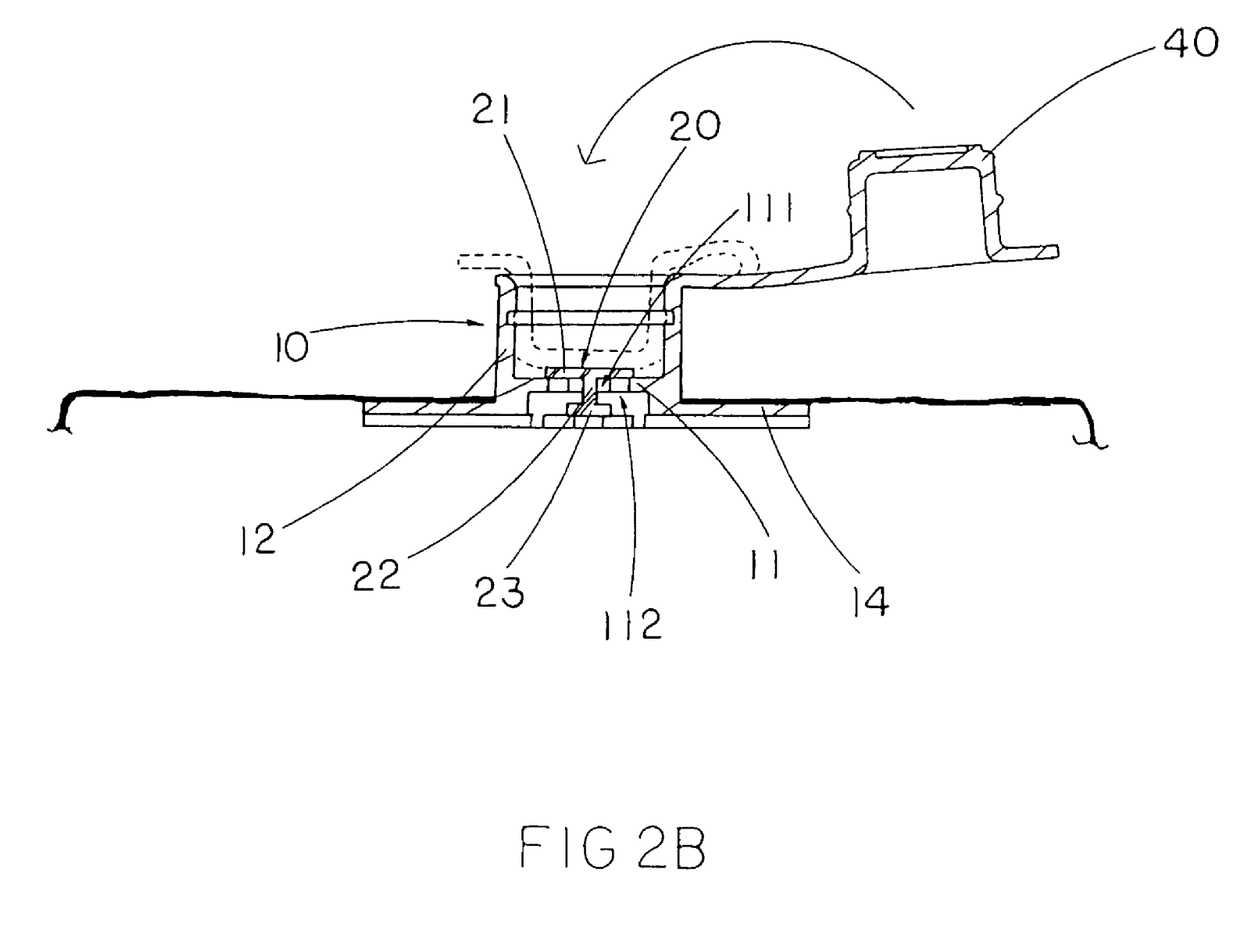

Referring to FIG. 1, FIG. 2A and FIG. 2B of the drawings, a vacuum pump valve of a container according to a first preferred embodiment of the present invention is illustrated, in which the container has a receiving cavity subject to an interior pressure, and an opening communicating with the receiving cavity. The vacuum pump valve comprises a valve body 10 and a suction element 20.

According to a first preferred embodiment of the present invention, the valve body 10 comprises a sealing platform 11 sealedly attached on the container at the opening thereof, and a guiding sleeve 12 upwardly extended from the sealing platform 11 to form a suction channel 13, wherein the sealing platform 11 has an operation hole 111 formed thereon at a position within the suction channel 13, and at least a through ventilating groove 112 communicating the receiving cavity of the container with an exterior thereof, which is subject to an exterior pressure.

On the other hand, the suction element 20, which is disposed within the suction channel 13 of the valve body 10, comprises an enlarged sealing head 21 adapted to seal on the sealing platform 11 to enclose the ventilating groove 112 thereof, and a guiding shaft 22 extended from the sealing head 21 to slidably mounted at the sealing platform 11 at the operation hole 111 to move the sealing head 21 between a releasing position and a sealing position, wherein at the releasing position, where the interior pressure is greater than the exterior pressure, the guiding shaft 22 is upwardly slid along the operation hole 111 to upwardly pull the sealing head 21 apart from the sealing platform 11 so as to allow air in the cavity to be withdrawn through the ventilating groove 112 by the virtue of pressure differential between the receiving cavity and the exterior thereof, as shown in FIG. 2A of the drawings.

On the other hand, when the sealing head 21 is at the sealing position, wherein the exterior pressure is greater than the interior pressure, the guiding shaft 22 is downwardly slid along the operation hole 111 to seal the sealing head 21 on the sealing platform 11 at the ventilating groove 112 so as to retain the container in a vacuum manner, as shown in FIG. 2B of the drawings.

According to the first preferred embodiment of the present invention, the container is embodied as a plastic bag having the receiving cavity which defines the opening wherein the vacuum pump valve is arranged to communicates with the opening so as to selectively allow passage of air therethough, or alternatively, sealing of that opening to maintain the vacuum effect within the plastic bag.

Figure 3:
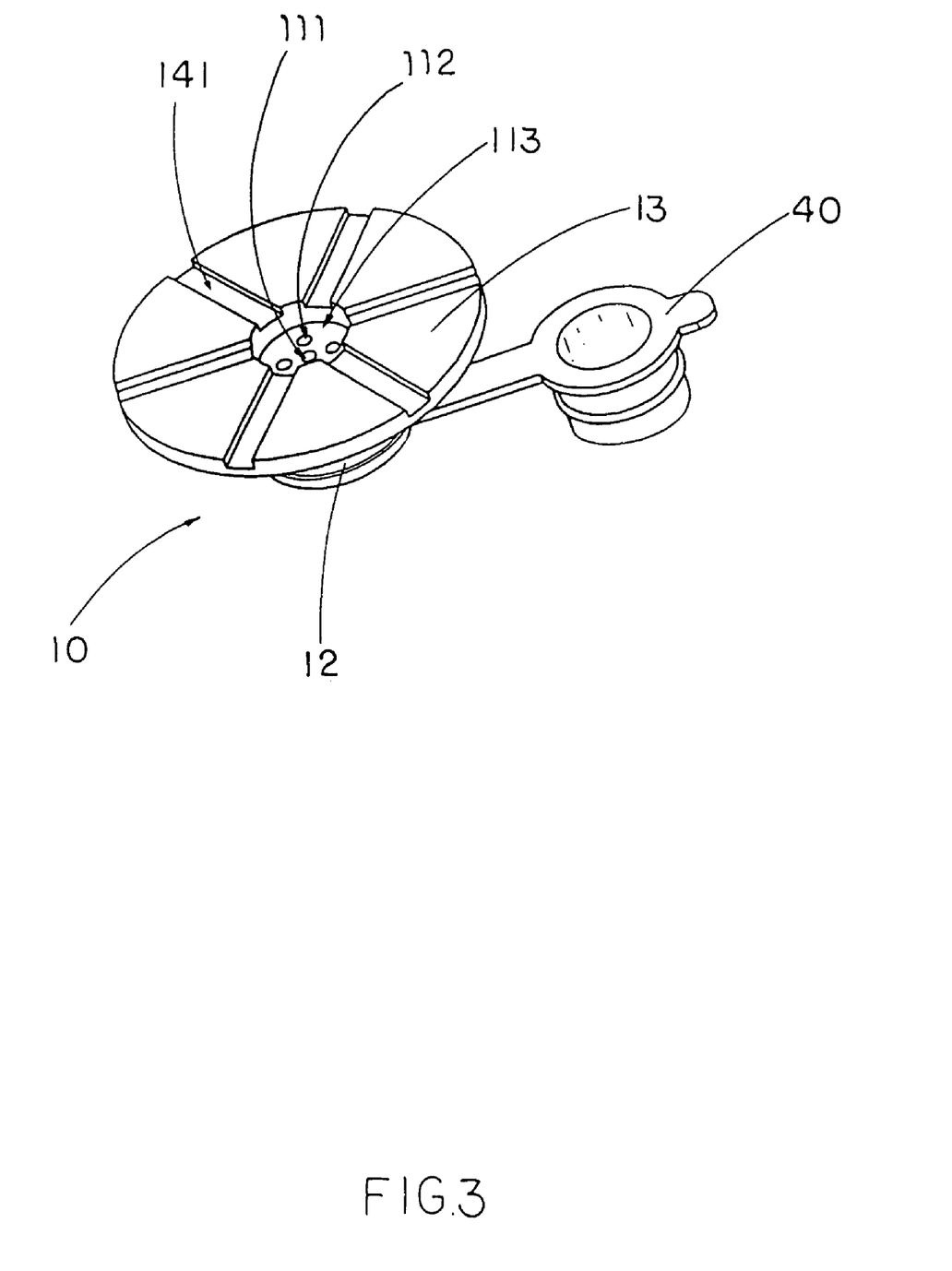
FIG. 3 is a perspective view of the vacuum pump valve according to the above preferred embodiment of the present invention, illustrating the suction grooves are radially extended to communicate the suction compartment with the receiving cavity.

Referring to FIG. 2A, FIG. 2B and FIG. 3 of the drawings, the guiding sleeve 12 is penetrating through the opening of the container for communicating the receiving cavity with an exterior of the container through the suction channel 13, wherein the valve body 10 further comprises a securing base 14 outwardly extended from a bottom end of the guiding sleeve 12 underneath the sealing platform 11 for sealing at an inner side of the container, such as the sealing bag, at a position that the opening of the sealing bag is sealed around the guiding sleeve 12 so as to sealedly attach the valve body 10 to the sealing bag. Moreover, the sealing platform 11 and the securing base 13 together define a vacuum compartment 113 therebetween within the receiving cavity of the container.

The sealing platform 11 has a plurality of ventilating holes eccentrically distributed thereon adjacent to the operation hole 111 wherein the ventilating holes are formed as a plurality of the ventilating grooves 112 in such a manner that the enlarged sealing head 21 of the suction element 20 is radially extended from the guiding shaft 22 for sealing on the sealing platform 11 at the ventilating grooves 112 so as to block passage of air between the receiving cavity and an exterior thereof.

It is worth mentioning that the suction element 20 further comprises means for retaining the guiding shaft 22 in position when it is at the releasing position. The retaining means is preferably embodied as a blocking latch 23 integrally protruded from a lower end of the guiding shaft 22 to lock up the guiding shaft 22 at the operation hole 111 in a slidably movable manner so as to block a further upward movement of the sealing head 21 when the sealing head 21 is upwardly moved at the releasing position.

In other words, the blocking latch 23 is sidewardly extended from a lower end portion of the guiding shaft 21 to align with an bottom surface of the sealing platform 11 such that when the guiding shaft is upwardly slid along the operation hole 111 at the releasing position, the blocking latch 23 is arranged to bias against the bottom surface of the sealing platform 11 so as stop the guiding shaft 21 from further sliding upwardly which would have led it to be detached from the operation hole 111.

As first preferred embodiment, as shown in FIG. 2A and FIG. 2B of the drawings, the blocking latch 23 is circular in shape and radially and coaxially extended from the guiding sleeve 12 for retaining the valve body 10 in position at the opening, while allowing communication between the receiving cavity and the suction channel 13.

The valve body 10 is adapted for use in conjunction with a vacuum pump which is utilized for withdrawing air from the container so as to create a vacuum effect in the receiving cavity. Accordingly, the guiding sleeve should be shaped and crafted to allow communicating with a pumping nozzle of the vacuum pump such that it is capable of withdrawing air from the receiving cavity of the container via the suction channel 13.

In order to fully seal the container, the vacuum pump valve of the present invention further comprises a retention lock 40 detachably mounted at the guiding sleeve 12 to enclose the suction channel 13 between a locked position and an unlocked position, wherein at the locked position, the retention lock 40 is sealed at the guiding sleeve 12 at a position that a bottom biasing wall of the retention lock 40 pushes the sealing head 21 downwardly to seal on the sealing platform 11 so as to ensure that the suction element 20 sealing on the valve body 10, and at the unlocked position, the retention lock 40 is slidably lifted up to allow the sealing head 21 to be pulled apart from the sealing platform 11 for discharging the air in the receiving cavity of the container. In other words, by attaching the retention lock 40 on the guiding sleeve 12, air is blocked from entering into the suction channel 13 after the container has been sealed.

Referring to FIG. 3 of the drawings, in order to further improve suction features of the present invention, the securing base 14, which is radially extended from the guiding sleeve 12 and adapted to attach on the plastic bag within the receiving cavity, has a plurality of suction grooves 141 indently formed at a bottom surface thereon to communicate the receiving cavity with the vacuum compartment 113 and the ventilating grooves 112 of the sealing platform 11 for guiding the air in the receiving cavity of the sealing bag towards the ventilating groove 112 of said sealing platform 11.

Specifically, the suction grooves 141 are radially extended from a central portion of the blocking latch 23 such that air in the vicinity of the respective end of each of the suction grooves 141 is allowed to pass through the respective suction groove 141 to reach the vacuum compartment 113.

The operation of the present invention according to the first preferred embodiment is as follows:

The retention lock 40 is first opened to allow passage of air with the suction channel 13. After that, a suction nozzle of the vacuum pump should be fittedly engaged with the guiding sleeve 12. The vacuum pump is then turn on for drawing air in the receiving cavity through the ventilating grooves 112 while the suction element 20 is moved by pressure difference to slid upwardly so as to pull the enlarged sealing head 21 above the ventilating grooves 112. As a result, air within the receiving cavity will be gradually withdrawn and the plastic bag collapses. At this stage, the vacuum pump creates a smaller exterior pressure with respect to the greater interior pressure so as to draw air form the receiving cavity to the exterior thereof.

It is important to point out at this stage that when the plastic bag collapses, the suction grooves 141 assists in guiding air at two sides of the receiving cavity to be withdrawn to the suction compartment 113 such that even if the plastic bag collapses to possibly block the central portion of the blocking latch 23, air within the receiving cavity can still to be withdrawn through the suction grooves 231.

When the plastic bag is fully vaccumized, it is to be detached from the guiding sleeve 12. Then, higher exterior pressure (atmospheric pressure) will force the suction element 20 moving towards the receiving cavity having smaller interior pressure to slide downwardly along the operation hole 111 until the enlarged sealing head 21 is moved to seal on the sealing platform 11 at the ventilating grooves 112. At this stage, a user of the present invention may close the guiding sleeve 12 by the retention lock 40 so as to securely seal the plastic bag for a prolonged period of time.

Figure 4:
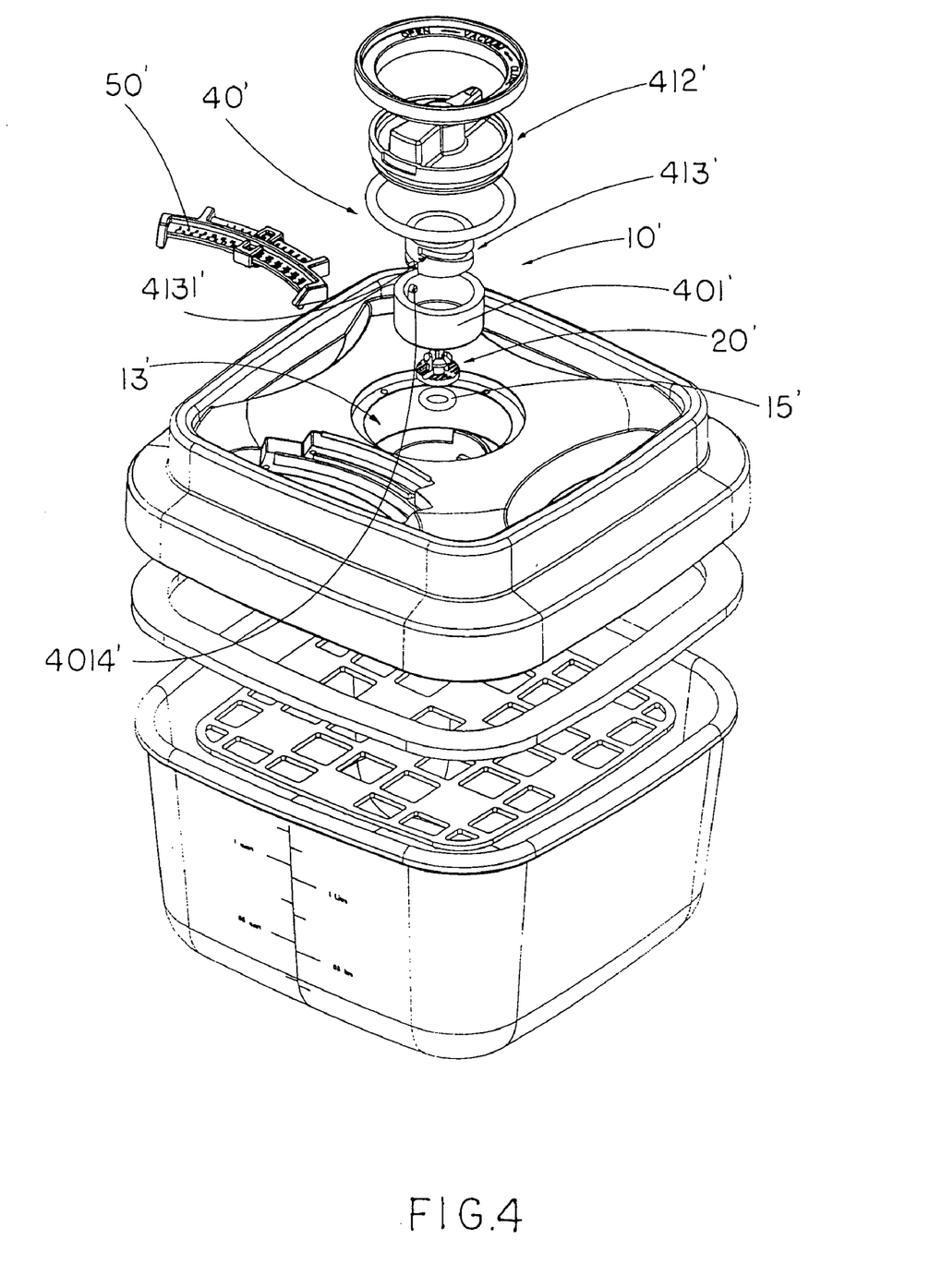
FIG. 4 is an exploded perspective view of a vacuum pump valve of a container according to a second preferred embodiment of the present invention.
Figure 5A:
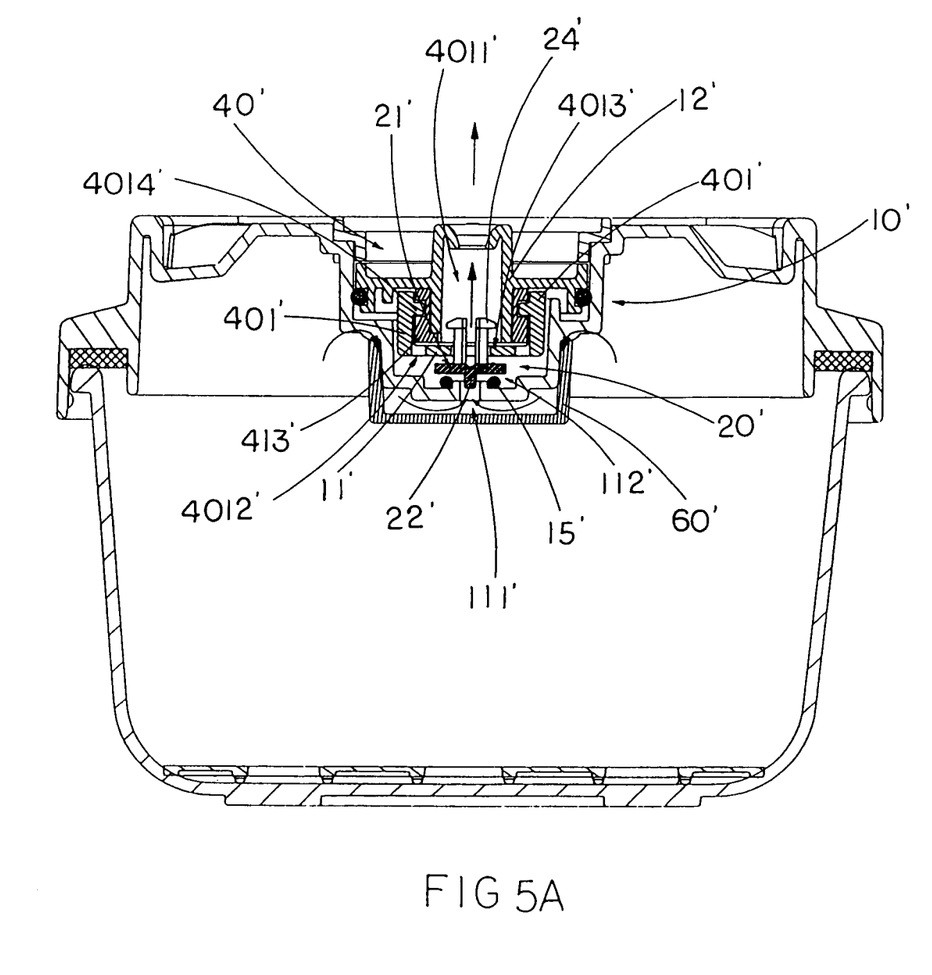
FIG. 5A and FIG. 5B are sectional side views of the vacuum pump valve according to the above second preferred embodiment of the present invention, illustrating that the suction element is at the releasing position and a sealing position respectively.
Figure 5B:
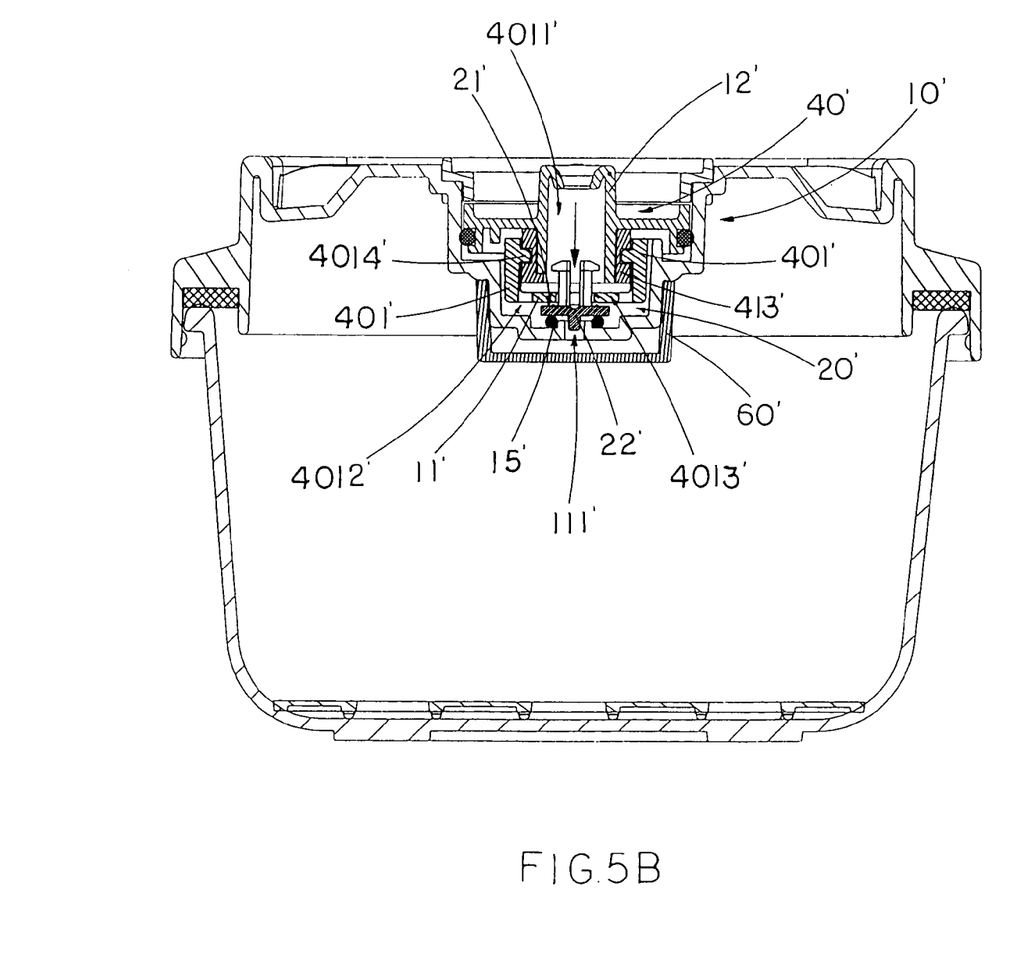

Referring to FIG. 4 and FIG. 5A and FIG. 5B of the drawings, a vacuum pump valve according to a second preferred embodiment of the present invention is illustrated, in which the vacuum pump valve of a container having a receiving cavity subject to an interior pressure comprises a valve body 10', and a suction element 20'.

The valve body 10' comprises a sealing platform 11' sealedly attached on the container at the opening thereof, and a guiding sleeve 12' upwardly extended from the sealing platform 11' to form a suction channel 13', wherein the sealing platform 11' has an operation hole 111' formed thereon at a position within the suction channel 13', and at least a through ventilating groove communicating the receiving cavity of the container with an exterior thereof, which is subject to an exterior pressure.

On the other hand, the suction element 20', which is disposed within the suction channel 13' of the valve body 10', comprises an enlarged sealing head 21' adapted to seal on the sealing platform 11' to enclose the ventilating groove 112' thereof, and a guiding shaft 22' extended from the sealing head 21' to slidably mount at the sealing platform 11' at the operation hole 111' to move the sealing head 21' between a releasing position and a sealing position, wherein at the releasing position, where the interior pressure is greater than the exterior pressure, the guiding shaft 22' is upwardly slid along the operation hole 111' to upwardly pull the sealing head 21' apart from the sealing platform 11' so as to allow air in the cavity to be withdrawn through the ventilating groove 112' through pressure differential between the interior pressure and the exterior pressure, as shown in FIG. 5A of the drawings.

On the other hand, when sealing head 21' is at the sealing position, where the exterior pressure is greater than the interior pressure, the guiding shaft 22' is downwardly slid along the operation hole 111' to seal the sealing head 21' on the sealing platform 11' at the ventilating groove 112' so as to retain the container in a vacuum manner, as shown in FIG. 5B of the drawings.

According to the second preferred embodiment of the present invention, the guiding shaft 22' of the suction element 20' has a diameter smaller than that of the operation hole 111' so as to define a ventilating clearance between the respective sidewalls of the guiding shaft 22' and the operation hole 111' wherein the ventilating groove 112' is formed as the ventilating clearance so as to communicate the receiving cavity with an exterior thereof for allowing air to pass therethrough.

In other words, when the suction element 20' is at the sealing position, the enlarged sealing head 21' is slid downwardly to close the operation hole 111' so as to seal the ventilating groove 112' for sealing the receiving cavity of the container.

Furthermore, the valve body 10' further comprises a sealing ring 15' disposed between an upper side of the sealing platform 11' and a lower side of the enlarged sealing head 21' of the suction element 20' in such a manner to coaxially align with the operation hole 111', so as to selectively block the ventilating groove 112' from communicating the receiving cavity and the exterior thereof.

Specifically, when the suction element 20' is at the releasing position, the enlarged sealing head 21' is slid upwardly to move away from the sealing ring 15' so as to allow the receiving cavity communicating with the exterior thereof via the ventilating groove 112', as shown in FIG. 5A of the drawings. On the other hand, when the suction element 20' is at the sealing position, the enlarged sealing head 21' is downwardly slid towards the receiving cavity so as to block the ventilating groove 112' at the sealing ring 15' for sealing the receiving cavity with the exterior thereof.

According to the second preferred embodiment of the present invention, the vacuum pump valve is meant to be use in conjunction with the container which is embodied as a rigid container.

As in the first preferred embodiment, the vacuum pump valve also further comprises a retention lock 40' comprising an air passage regulator 401' movably disposed within the suction channel 13', wherein the air passage regulator 401' is tubular in shape having an air cavity 4011' formed therein and a top opening communicating the air cavity 4011' with an exterior of the valve body 10'. Moreover, the air passage regulator 401' further has a plurality of through air passage holes 4012' formed on a bottom wall 4013' of the air passage regulator 401' for communicating the suction channel 13' with the air cavity 4011'. According to the second preferred embodiment, the air passage regulator 401' is adapted to move between a locking position and an unlock position, wherein at the locking position, the air passage regulator 401' is sealed at the guiding sleeve 12' at a position that the bottom wall 4013' of the air passage regulator 401' pushes the sealing head 21' downwardly to seal on the sealing platform 10' so as to ensure the suction element 20' sealing on the valve body 10'. In other words, air is not allowed to pass through the air passage holes 4012' and the ventilating groove 112' for creating the vacuum environment within the container.

On the other hand, when the air passage regulator 401' is at the unlock position, the air passage regulator 401' is slidably lifted up to allow the sealing head 21' to be pulled apart from the sealing platform 11' for discharging the air in the receiving cavity. Thus, the air passage regulator 401' is upwardly slid to create a suction gap between the enlarged sealing head 21' and the bottom wall 4013' of the air passage regulator 401' in such a manner the enlarged sealing head 21' is now capable of moving to the releasing position and create the ventilating groove 112' at the operation hole 111' and the clearance between the enlarged sealing head 21' and the sealing ring 15'. In such a case, air within the receiving cavity of the container is allowed to be withdrawn through the ventilating groove 112' and the air passage holes 4012' to reach an air cavity 4011' so as to be discharged to an exterior of the container.

Moreover, the retention lock 40' further comprises a sealing actuator 412' and a guiding rotor 413', which is also tubular in shape, provided in the air cavity 4011' within the suction channel 13' for operatively moving the air passage regulator 401' between the locked position and the unlock position in a linear manner.

Referring to FIG. 5A and FIG. 5B of the drawings, the guiding rotor 413' has at least one guiding track 4131' spirally formed at an outer circumferential surface thereof wherein the air passage regulator 401' further has an engaging pin 4014' protruded from a sidewall of the air cavity 4011' to sildably engage with the guiding track 4131' of the guiding rotor 413'. On the other hand, the sealing actuator 412' is provided on top of the air passage regulator 401' to drive the guiding rotor 413' to rotate in a predetermined open direction. Once the guiding rotor 413' is driven to rotate, the engaging pin 4014' is arranged to sildably move upwardly alone the guiding track 4131' so as to move the air passage regulator 401' upwardly alone the suction channel 13' to reach the unlock position, where air is allowed to pass through the ventilating groove 112' and the air passage holes 4012' for being extracted out of the container.

From the forgoing descriptions, it can be deduced that the operation of the present invention according to the second preferred embodiment is as follows:

Referring to FIG. 5A of the drawings, in order to withdraw air from the container, the sealing actuator 412' is rotated to drive the guiding rotor 413' to rotate. Once the guiding rotor 413' is rotated, the air passage regulator is driven to move upwardly as guided by the guiding track 4131'. A vacuum pump is adapted to engage with the valve body 10' to create a sucking effect. As such, the suction element 20' is pulled to move upwardly due to greater interior pressure and air is allowed to pass through the ventilating groove 112' and the air passage holes 4012' to reach an exterior of the container.

After the air has been withdrawn from the receiving cavity, greater exterior pressure will force the suction element 20' moving back to the sealing position. In order to lock the suction element 20' in position, the sealing actuator 412' is rotated in a predetermined locking direction which is opposite to the open direction so as to drive the air passage regulator 401' moving downwardly along the suction channel 13' at the locking position, as shown in FIG. 5B of the drawings.

In order to retain the suction element 20' in position within the operation hole 111', it further comprises two holding arms 24' upwardly and sidewardly extended from the enlarged sealing head 21' to align with the bottom wall 4013' of the air passage regulator 401' so as to retain the suction element 20' substantially within the operation hole 111'.

According to the second preferred embodiment of the present invention, the vacuum pump valve further comprises a tubular vacuum separator 60' mounted within the receiving cavity underneath the valve body 10' to prevent said air being directly extracted towards the suction element 20' from the receiving cavity, wherein a vacuum gap is formed between the guiding sleeve 12' and a top edge of the vacuum separator 60' for allowing the air to be withdrawn to the suction element 20' through the vacuum opening, as shown in FIG. 5A of the drawings.

In order to enhance the features of the present invention, the vacuum pump valve further comprises a date indicator 50' provided on the valve body 10' to indicate the date of vacuuming by the vacuum pump.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A vacuum pump valve of a container having a receiving cavity subject to an interior pressure and an opening communicating with said receiving cavity, wherein said vacuum pump valve comprises:

a valve body comprising a sealing platform sealedly attached on said container at said opening thereof, and a guiding sleeve upwardly extended from said sealing platform to form a suction channel, wherein said sealing platform has an operation hole formed thereon at a position within said suction channel and at least a through ventilating groove communicating said receiving cavity of said container with an exterior thereof, so as to allow suction of air from said receiving cavity through pressure differential between said interior pressure and an atmosphere pressure;

a suction element, which is disposed within said suction channel of said valve body, comprising an enlarged sealing head adapted to seal on said sealing platform to enclose said ventilating groove thereof and a guiding shaft which is extended from said sealing head and is slidably mount at said sealing platform at said operation hole to move said sealing head between a releasing position and a sealing position, wherein at said releasing position, said guiding shaft is upwardly slid along said operation hole to upwardly pull said sealing head apart from said sealing platform so as to allow air in said receiving cavity to be withdrawn through said ventilating groove, and at said sealing position, where said atmosphere pressure is greater than said interior pressure, said guiding shaft is forced to downwardly slide along said operation hole to seal said sealing head on said sealing platform at said ventilating groove so as to retain said container in a vacuum manner, wherein said guiding shaft of said suction element has a diameter smaller than a diameter of said operation hole define a ventilating clearance between a surrounding wall of said guiding shaft and said operation hole, wherein said ventilating clearance is embodied as said ventilating groove to communicate said receiving cavity with said exterior thereof for allowing air to pass therethrough, and a retention lock which comprises a tubular air passage regulator slidably disposed within said suction channel between a locked position and an unlocked position, wherein at said locked position, said air passage regulator is sealed at said guiding sleeve at a position that a bottom wall of said air passage regulator pushes said sealing head downwardly to seal on said sealing platform so as to ensure said suction element sealing on said valve body, and at said unlocked position, said air passage regulator is slidably lifted up to allow said sealing head to be pulled apart from said sealing platform for discharging said air in said receiving cavity.

2. The vacuum pump valve, as recited in claim 1, wherein said air passage regulator has a plurality of through air passage holes formed on said bottom wall of said air passage regulator for communicating said suction channel, such that said air within said receiving cavity is discharged out of said container from said suction channel to said air passage regulator through said air passage holes when said air passage regulator is slid upwardly at said unlocked position.

3. The vacuum pump valve, as recited in claim 1, wherein said retention lock further comprises a sealing actuator and a tubular guiding rotor provided in said air passage regulator within said suction channel for linearly moving said air passage regulator between said locked position and said unlock position.

4. The vacuum pump valve, as recited in claim 2, wherein said retention lock further comprises a sealing actuator and a tubular guiding rotor provided in said air passage regulator within said suction channel for linearly moving said air passage regulator between said locked position and said unlock position.

5. The vacuum pump valve, as recited in claim 3, wherein said guiding rotor has at least one guiding track spirally formed at an outer circumferential surface thereof, and said air passage regulator further has an engaging pin protruded from a sidewall thereof to slidably engage with said guiding track of said guiding rotor, wherein when said guiding rotor is driven to rotate, said engaging pin is slidably moved along said guiding track to drive said air passage regulator upwardly along said suction channel until said air passage regulator is moved at said unlock position, where air is allowed to pass through said ventilating groove and said air passage holes for being extracted to create a vacuum effect in said receiving cavity.

6. The vacuum pump valve, as recited in claim 4, wherein said guiding rotor has at least one guiding track spirally formed at an outer circumferential surface thereof, and said air passage regulator further has an engaging pin protruded from a sidewall thereof to slidably engage with said guiding track of said guiding rotor, wherein when said guiding rotor is driven to rotate, said engaging pin is slidably moved along said guiding track to drive said air passage regulator upwardly along said suction channel until said air passage regulator is moved at said unlock position, where air is allowed to pass through said ventilating groove and said air passage holes for being extracted to create a vacuum effect in said receiving cavity.

7. The vacuum pump valve, as recited in claim 2, wherein said valve body further comprises a sealing ring disposed between an upper side of said sealing platform and a lower side of said sealing head of said suction element in such a manner to coaxially align with said operation hole for selectively blocking said ventilating groove from communicating said receiving cavity and said exterior thereof.

8. The vacuum pump valve, as recited in claim 6, wherein said valve body further comprises a sealing ring disposed between an upper side of said sealing platform and a lower side of said enlarged sealing head of said suction element in such a manner to coaxially align with said operation hole for selectively blocking said ventilating groove from communicating said receiving cavity and said exterior thereof.

9. The vacuum pump valve, as recited in claim 6, further comprising a vacuum separator spacedly mounted underneath said valve body within said receiving cavity to prevent said air being directly extracted towards said suction element from said receiving cavity, wherein a vacuum gap is formed between said guiding sleeve and a top edge of said vacuum separator for allowing said air to be withdrawn to said suction element through said vacuum opening.

10. The vacuum pump valve, as recited in claim 8, further comprising a vacuum separator spacedly mounted underneath said valve body within said receiving cavity to prevent said air being directly extracted towards said suction element from said receiving cavity, wherein a vacuum gap is formed between said guiding sleeve and a top edge of said vacuum separator for allowing said air to be withdrawn to said suction element through said vacuum opening.

11. The vacuum pump valve, as recited in claim 6, further comprises a date indicator provided on said valve body to indicate a vacuuming date of said container.

12. The vacuum pump valve, as recited in claim 8, further comprises a date indicator provided on said valve body to indicate a vacuuming date of said container.

13. The vacuum pump valve, as recited in claim 10, further comprises a date indicator provided on said valve body to indicate a vacuuming date of said container.

* * * * *